(12) United States Patent
Lien et al.

(10) Patent No.: US 9,116,576 B2
(45) Date of Patent: Aug. 25, 2015

(54) PHOTOSENSITIVE PIXEL CIRCUIT OF TOUCH MODULE

(71) Applicant: Au Optronics Corporation, Hsinchu (TW)

(72) Inventors: Chung-Min Lien, Taipei (TW); Ya-Ling Hsu, New Taipei (TW); Gang-Yi Lin, Taitung County (TW)

(73) Assignee: Au Optronics Corporation, Hsinchu (TW)

( * ) Notice: Subject to any disclaimer, the term of this patent is extended or adjusted under 35 U.S.C. 154(b) by 77 days.

(21) Appl. No.: 14/162,778

(22) Filed: Jan. 24, 2014

(65) Prior Publication Data

US 2015/0085202 A1    Mar. 26, 2015

(30) Foreign Application Priority Data

Sep. 25, 2013 (TW) .............................. 102134570 A

(51) Int. Cl.
*G06F 3/042* (2006.01)
(52) U.S. Cl.
CPC .................................. *G06F 3/0421* (2013.01)

(58) Field of Classification Search
USPC .................................................. 345/173, 174
See application file for complete search history.

(56) References Cited

U.S. PATENT DOCUMENTS

| | | | |
|---|---|---|---|
| 7,928,972 B2 | 4/2011 | Sato et al. | |
| 2006/0033016 A1* | 2/2006 | Ogawa et al. | 250/221 |
| 2006/0273238 A1* | 12/2006 | Sugiyama et al. | 250/208.1 |
| 2009/0002341 A1 | 1/2009 | Saito et al. | |
| 2010/0220077 A1* | 9/2010 | Fukunaga et al. | 345/175 |
| 2010/0225615 A1* | 9/2010 | Kurokawa | 345/175 |

FOREIGN PATENT DOCUMENTS

CN         102207647         10/2011

* cited by examiner

*Primary Examiner* — Charles V Hicks
*Assistant Examiner* — Jeffrey S Steinberg
(74) *Attorney, Agent, or Firm* — Jianq Chyun IP Office

(57) ABSTRACT

A photosensitive pixel circuit of a touch module including an output transistor and a light detection unit is provided. The output transistor receives a reference signal and provides a touch voltage controlled by a light detection voltage. The light detection unit is electrically connected to the output transistor, and receives a touch scan signal. The light detection unit detects an intensity of a light according to the touch scan signal so as to correspondingly provide the light detection voltage.

11 Claims, 8 Drawing Sheets

PHOTOSENSITIVE PIXEL CIRCUIT OF TOUCH MODULE

CROSS-REFERENCE TO RELATED APPLICATION

This application claims the priority benefit of Taiwan application serial no. 102134570, filed on Sep. 25, 2013. The entirety of the above-mentioned patent application is hereby incorporated by reference herein and made a part of this specification.

FIELD OF THE INVENTION

The invention relates to a pixel circuit, and more particularly, to a photosensitive pixel circuit of a touch module.

DESCRIPTION OF RELATED ART

In recent years, as information technology, wireless mobile communication and information appliances have been rapidly developed and applied, to achieve more convenience, more compact and light volume and more user-friendly designs, various information products have changed from using conventional input devices such as keyboards or mice to using touch modules. Based on different sensing types, touch modules are roughly classified into resistive touch modules, capacitive touch modules, optical touch modules, acoustic-wave touch modules and electromagnetic touch modules.

In an optical touch module built in a display panel, a photosensitive pixel is formed by disposing a photosensitive element (e.g. photosensitive diode or photosensitive transistor) in a pixel. Generally, a current of the photosensitive element differs corresponding to light intensity. Thus, a capacitor charging method may be utilized to detect whether the photosensitive element is covered (i.e. touched), so as to determine a touch point. However, if a capacitance used is excessively large, a detection time of the photosensitive pixel is extended; if the capacitance used is excessively small, a detection result of the photosensitive pixel is affected by a leakage current of the photosensitive element. Therefore, in order to enhance touch efficiency, improvement of a photosensitive pixel circuit has become an important topic.

SUMMARY OF THE INVENTION

The invention provides a photosensitive pixel circuit of a touch module, which increases a sensing speed and sensing sensitivity of the touch module.

The photosensitive pixel circuit of a touch module provided by the invention includes an output transistor and a light detection unit. The output transistor includes a first source/drain end, a second source/drain end and a first control end, wherein the first source/drain end receives a reference signal, the first control end receives a light detection voltage, and the second source/drain end provides a touch voltage. The light detection unit is electrically connected to the first control end of the output transistor and receives a touch scan signal. Accordingly, the light detection unit detects an intensity of a first light according to the touch scan signal so as to correspondingly provide the light detection voltage.

In an embodiment of the invention, the light detection unit includes a first photosensitive transistor and a voltage divider transistor. The first photosensitive transistor includes a third source/drain end, a fourth source/drain end and a second control end, and is configured to sense the first light, wherein the third source/drain end receives the touch scan signal, the second control end is electrically connected to the fourth source/drain end, and the fourth source/drain end provides the light detection voltage. The voltage divider transistor includes a fifth source/drain end, a sixth source/drain end and a third control end, wherein the fifth source/drain end is electrically connected to the fourth source/drain end, the third control end is electrically connected to the sixth source/drain end, and the sixth source/drain end receives a system low voltage.

In an embodiment of the invention, the voltage divider transistor is a second photosensitive transistor configured to sense a second light, wherein the second light is different from the first light.

In an embodiment of the invention, when the first light is one of an infrared light and an ultraviolet light, the second light is an ambient light.

In an embodiment of the invention, when the first light is one of a green light, a red light and a blue light, the second light is another one of the green light, the red light and the blue light or the other light.

In an embodiment of the invention, the photosensitive pixel circuit of a touch module further includes a first switch transistor. The first switch transistor includes a seventh source/drain end, an eighth source/drain end and a fourth control end, wherein the seventh source/drain end is electrically connected to the second source/drain end to receive the touch voltage, the fourth control end receives a gate control signal, and the eighth source/drain end is electrically connected to a touch data line.

In an embodiment of the invention, the photosensitive pixel circuit of a touch module further includes a second switch transistor. The second switch transistor includes a ninth source/drain end, a tenth source/drain end and a fifth control end, wherein the ninth source/drain end is electrically connected to the second source/drain end to receive the touch voltage, the fifth control end receives the touch scan signal, and the tenth source/drain end is electrically connected to a touch data line.

In an embodiment of the invention, the reference signal has a fixed voltage.

In an embodiment of the invention, the reference signal is the touch scan signal.

In an embodiment of the invention, the touch scan signal is a pulse signal.

In an embodiment of the invention, the first light is one of an infrared light, a green light, a red light, a blue light and an ultraviolet light.

To make the above features and advantages of the invention more comprehensible, embodiments accompanied with drawings are described in detail as follows:

DETAILED DESCRIPTION OF DISCLOSED EMBODIMENTS

Figure 1A:
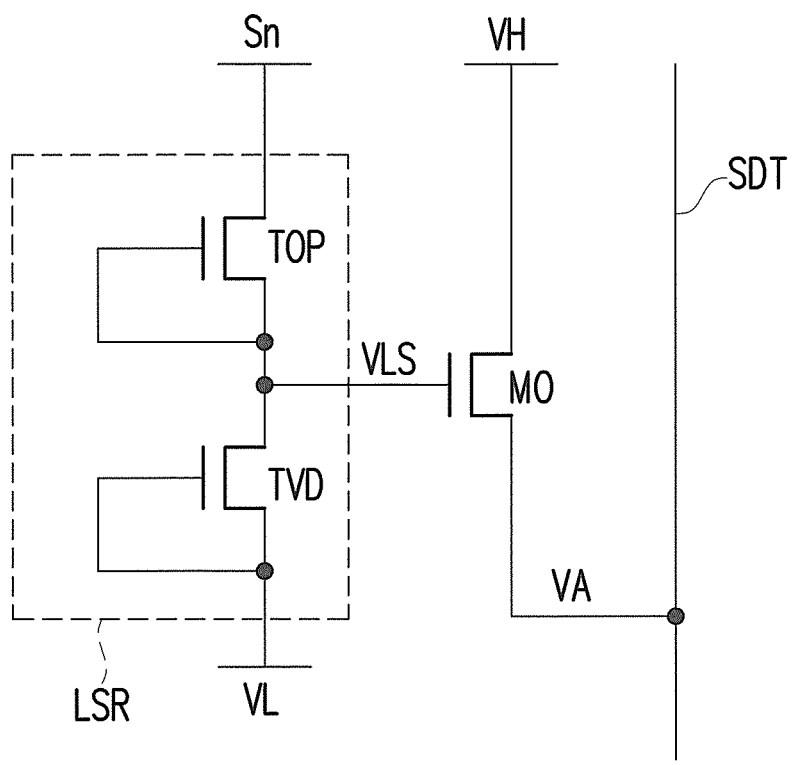
FIG. 1A is a schematic circuit diagram illustrating a photosensitive pixel circuit of a touch module according to the first embodiment of the invention.

FIG. 1A is a schematic circuit diagram illustrating a photosensitive pixel circuit of a touch module according to the first embodiment of the invention. Referring to FIG. 1A, in the present embodiment, a photosensitive pixel circuit SPX1 includes an output transistor MO and a light detection unit LSR. The light detection unit LSR includes, for example, a photosensitive transistor TOP and a voltage divider transistor TVD, wherein the voltage divider transistor TVD may be a transistor with photosensitivity (such as a photosensitive transistor) or a transistor without photosensitivity.

A drain (corresponding to a first source/drain end) of the output transistor MO receives a system high voltage VH (corresponding to a reference signal having a fixed voltage). A source (corresponding to a second source/drain end) of the output transistor MO is electrically connected to a touch data line SDT to provide a touch voltage VA. A gate (corresponding to a first control end) of the output transistor MO receives a light detection voltage VLS.

A drain (corresponding to a third source/drain end) of the photosensitive transistor TOP receives a touch scan signal Sn. A source (corresponding to a fourth source/drain end) of the photosensitive transistor TOP is electrically connected to a gate (corresponding to a second control end) of the photosensitive transistor TOP and provides the light detection voltage VLS, wherein the photosensitive transistor TOP is configured to sense a light (corresponding to a first light) of a specific wavelength, such as an infrared light, a green light, a red light, a blue light or an ultraviolet light. Moreover, the light may be filtered out by a color filter.

A drain (corresponding to a fifth source/drain end) of the voltage divider transistor TVD is electrically connected to the source of the photosensitive transistor TOP. A source (corresponding to a sixth source/drain end) of the voltage divider transistor TVD is electrically connected to a gate (corresponding to a third control end) of the voltage divider transistor TVD and receives a system low voltage VL.

Based on the above, the light detection unit LSR is electrically connected to the gate of the output transistor MO, and receives the touch scan signal Sn. Accordingly, the light detection unit LSR detects an intensity of the light of a specific wavelength according to the touch scan signal Sn so as to correspondingly provide the light detection voltage VLS.

Figure 1B:
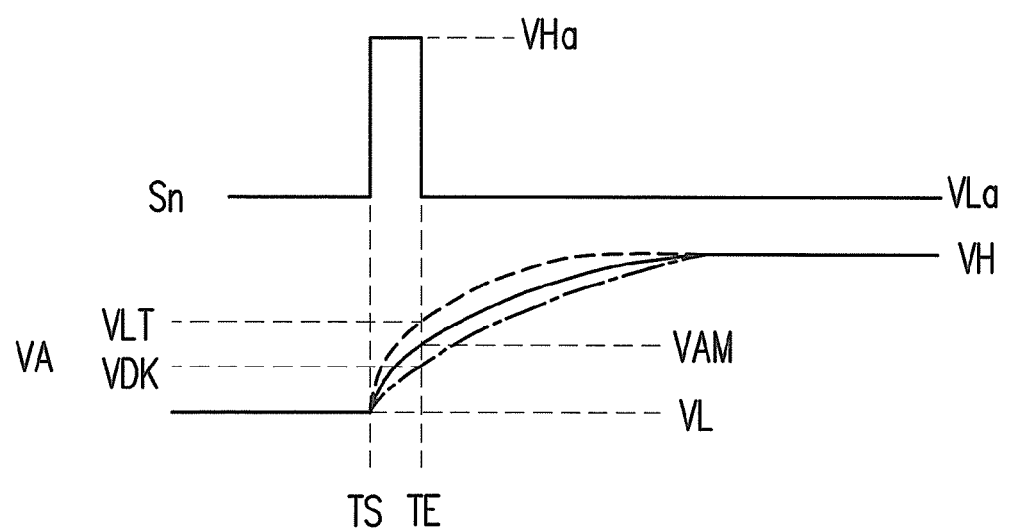
FIG. 1B is a schematic diagram illustrating driving waveforms of a photosensitive pixel circuit according to an embodiment of the invention.

FIG. 1B is a schematic diagram illustrating driving waveforms of a photosensitive pixel circuit according to an embodiment of the invention. Referring to FIG. 1A and FIG. 1B, in the present embodiment, a waveform of the touch voltage VA represented by a solid line corresponds to a situation in which an ambient light is received; a waveform of the touch voltage VA represented by an upper dashed line corresponds to a situation in which more of the light of the specific wavelength is received; and a waveform of the touch voltage VA represented by a lower dashed line corresponds to a situation in which no light is received. The touch scan signal Sn is, for example, a pulse signal. A system high voltage VHa may be the same as the system high voltage VH. A system low voltage VLa may be the same as the system low voltage VL. However, the embodiments of the invention are not limited thereto.

When the touch scan signal Sn is in an enable state (i.e. the touch scan signal Sn is the system high voltage VHa), the light detection voltage VLS is increased due to voltage division by the photosensitive transistor TOP and the voltage divider transistor TVD, so that the output transistor MO is conducted. At this moment, the system high voltage VH charges the source of the output transistor MO so that the touch voltage VA is increased. Moreover, the photosensitive pixel circuit SPX1 is regarded as being in a scan state.

When the photosensitive transistor TOP receives the light of a specific wavelength from the ambient light, the photosensitive transistor TOP generates a current (here, a leakage current). That is, the photosensitive transistor TOP generates a cross-voltage (i.e. voltage between a drain and a source), and a cross-voltage of the voltage divider transistor TVD is used as the light detection voltage VLS, so that the touch voltage VA is gradually increased. When the photosensitive transistor TOP receives more of the light of a specific wavelength (by being irradiated by a light pen, for example), the current (here, a leakage current) of the photosensitive transistor TOP is increased. That is, the cross-voltage (i.e. voltage between the drain and the source) of the photosensitive transistor TOP is decreased, and the cross-voltage of the voltage divider transistor TVD is increased, so that the light detection voltage VLS is higher, which means that the touch voltage VA is increased faster. In addition, when the photosensitive transistor TOP does not receive the light of a specific wavelength or receives a smaller amount of light, the current (here, a leakage current) of the photosensitive transistor TOP is decreased. That is, the cross-voltage (i.e. voltage between the drain and the source) of the photosensitive transistor TOP is increased, and the cross-voltage of the voltage divider transistor TVD is decreased, so that the light detection voltage VLS is lower, which means that the touch voltage VA is increased slower.

In the present embodiment, during a period in which the touch scan signal Sn is in a disable state (i.e. the touch scan signal Sn is the system low voltage VLa), the light detection voltage VLS is close to the system low voltage VL so that the output transistor MO is not conducted. At this moment, the photosensitive pixel circuit SPX1 is regarded as being in an idle state. Therefore, a charging of the touch voltage VA is executed during the period in which the touch scan signal Sn is in the enable state (i.e. the touch scan signal Sn is the system high voltage VHa), and that means from a time point TS to a time point TE. According to FIG. 1B, when the touch voltage VA finishes the charging, a touch circuit (not illustrated) detects a voltage VLT, VAM or VDK so as to determine if the photosensitive pixel circuit SPX1 is touched. Accordingly, a sensing speed and sensing sensitivity of a touch module (not illustrated) are increased.

In the aforementioned embodiment, if the voltage divider transistor TVD is a transistor without photosensitivity, by masking the voltage divider transistor TVD using a black matrix (BM), the voltage divider transistor TVD is not affected by any light. If the voltage divider transistor TVD is a transistor with photosensitivity (such as a photosensitive transistor) instead, the light may be filtered out by the color filter. As a result, the voltage divider transistor TVD is configured to sense a light of another specific wavelength (corresponding to a second light), i.e. a light different from that sensed by the photosensitive transistor TOP. Further, when the light sensed by the photosensitive transistor TOP is one of a green light, a red light and a blue light, the light sensed by the voltage divider transistor TVD is another one of the green light, the red light and the blue light or the other light. When the light sensed by the photosensitive transistor TOP is one of an infrared light and an ultraviolet light, the light sensed by the voltage divider transistor TVD is an ambient light (such as a white light). Accordingly, the ambient light part is compensated.

Figure 2:
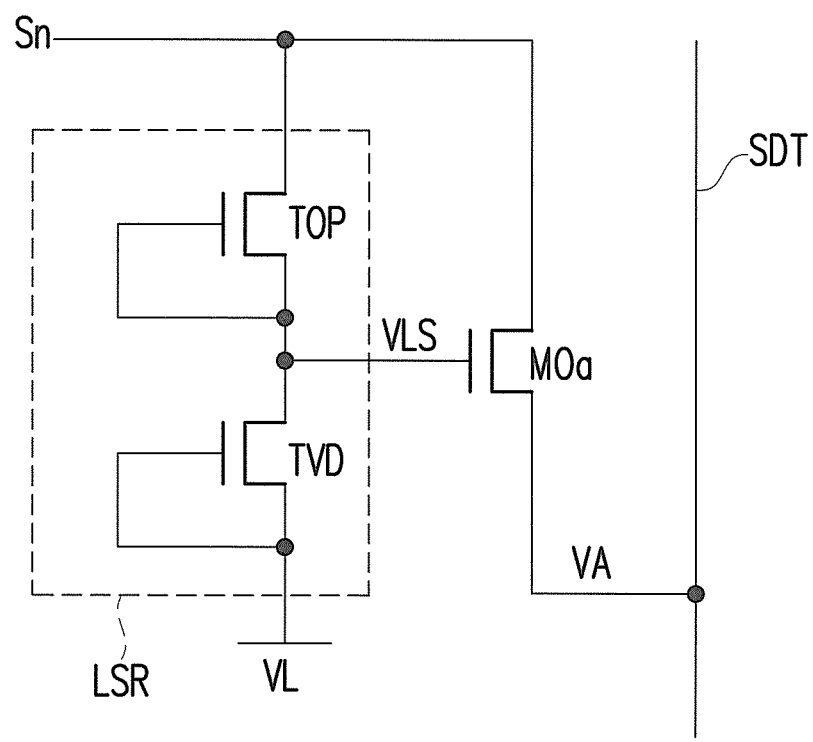
FIG. 2 is a schematic circuit diagram illustrating a photosensitive pixel circuit of a touch module according to the second embodiment of the invention.

FIG. 2 is a schematic circuit diagram illustrating a photosensitive pixel circuit of a touch module according to the second embodiment of the invention. Referring to FIG. 1A and FIG. 2, in the present embodiment, a photosensitive pixel circuit SPX2 is roughly the same as the photosensitive pixel circuit SPX1, and a difference therebetween lies in that a gate of an output transistor MOa receives the touch scan signal Sn, wherein the same or similar elements are denoted by the same or similar reference numerals. Moreover, the photosensitive pixel circuit SPX2 performs roughly the same circuit operation as the photosensitive pixel circuit SPX1, and a description thereof is omitted herein.

Figure 3A:
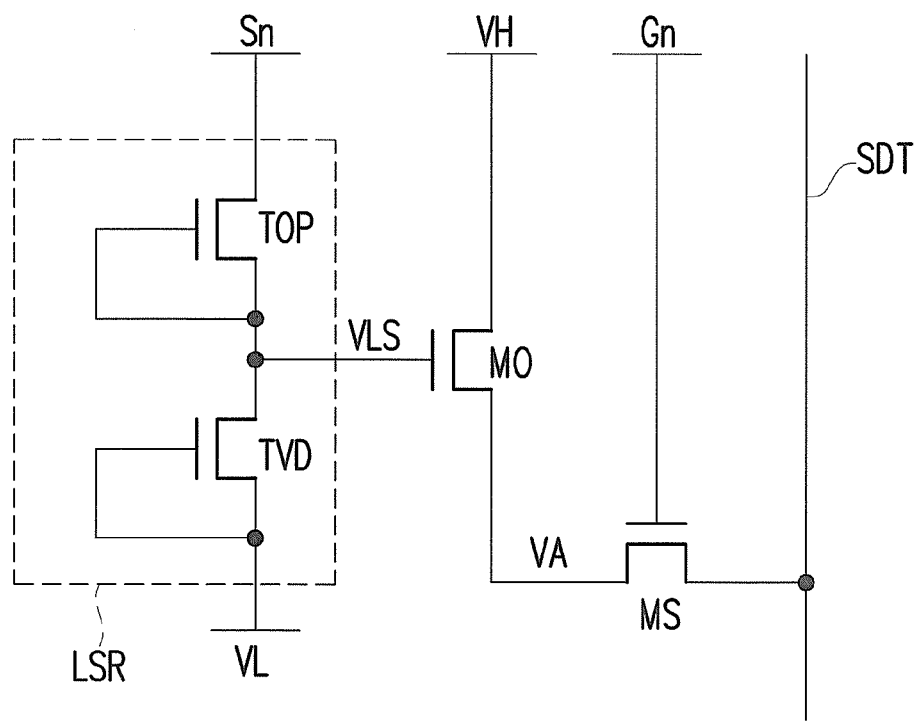
FIG. 3A is a schematic circuit diagram illustrating a photosensitive pixel circuit of a touch module according to the third embodiment of the invention.

FIG. 3A is a schematic circuit diagram illustrating a photosensitive pixel circuit of a touch module according to the third embodiment of the invention. Referring to FIG. 1A and FIG. 3A, in the present embodiment, a photosensitive pixel circuit SPX3 is roughly the same as the photosensitive pixel circuit SPX1, and a difference therebetween lies in that the photosensitive pixel circuit SPX3 further includes a switch transistor MS, wherein the same or similar elements are denoted by the same or similar reference numerals. A drain (corresponding to a seventh source/drain end) of the switch transistor MS is electrically connected to the source of the output transistor MO to receive the touch voltage VA. A source (corresponding to an eighth source/drain end) of the switch transistor MS is electrically connected to the touch data line SDT. A gate (corresponding to a fourth control end) of the switch transistor MS receives a gate control signal Gn, wherein the touch voltage VA provided by the output transistor MO is transmitted to the touch data line SDT through the switch transistor MS.

Figure 3B:
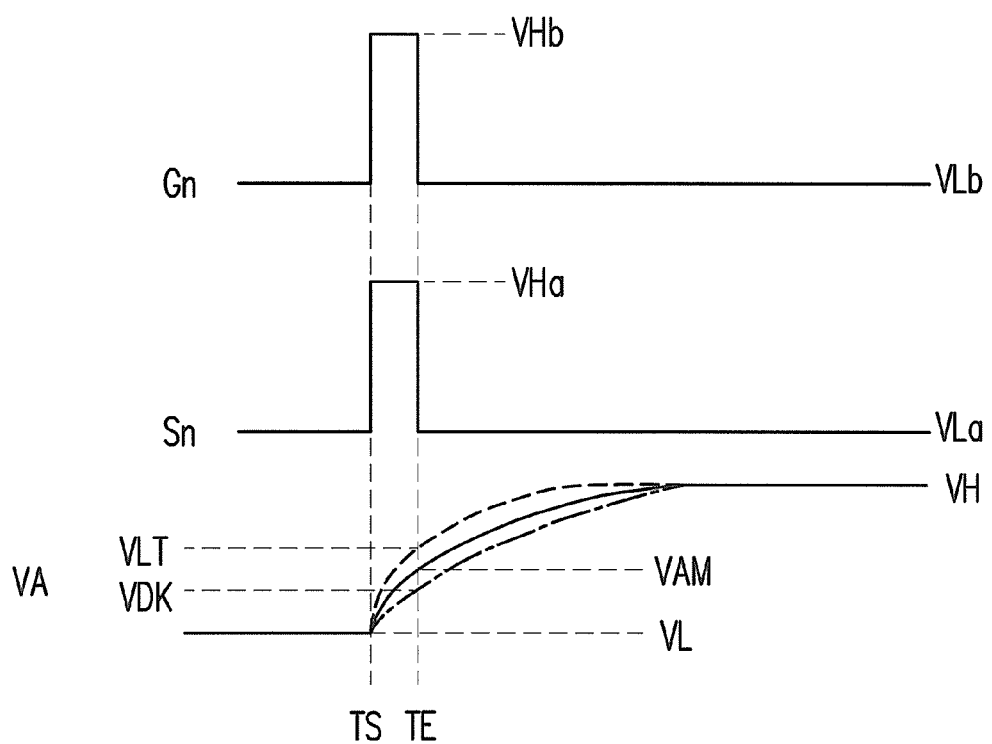
FIG. 3B is a schematic diagram illustrating driving waveforms of a photosensitive pixel circuit according to another embodiment of the invention.

FIG. 3B is a schematic diagram illustrating driving waveforms of a photosensitive pixel circuit according to another embodiment of the invention. Referring to FIG. 3A and FIG. 3B, in the present embodiment, the gate control signal Gn is, for example, a pulse signal, and has the same timing as the touch scan signal Sn, wherein a system high voltage VHb and a system low voltage VLb are respectively identical to the system high voltage VHa and the system low voltage VLa. However, the embodiments of the invention are not limited thereto.

Based on the above, at the same time when the system high voltage VH charges the source of the output transistor MO, the touch voltage VA is outputted to the touch data line SDT. When the touch voltage VA finishes the charging, the touch circuit (not illustrated) receives the touch voltage VA at a voltage level equal to the voltage VLT, VAM or VDK, so as to determine if the photosensitive pixel circuit SPX3 is touched.

Figure 4:
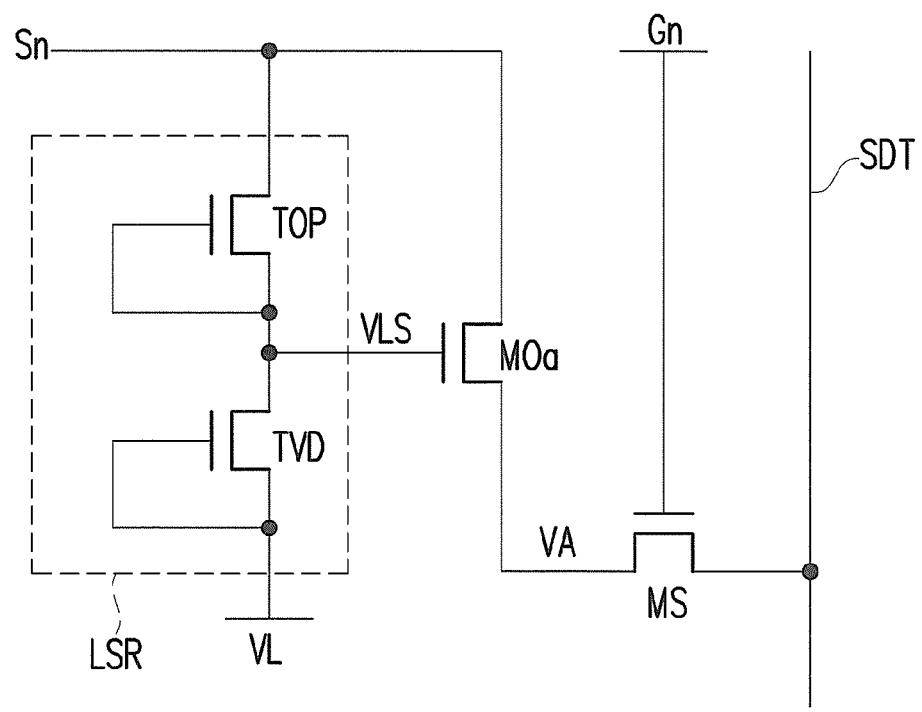
FIG. 4 is a schematic circuit diagram illustrating a photosensitive pixel circuit of a touch module according to the fourth embodiment of the invention.

FIG. 4 is a schematic circuit diagram illustrating a photosensitive pixel circuit of a touch module according to the fourth embodiment of the invention. Referring to FIG. 3A and FIG. 4, in the present embodiment, a photosensitive pixel circuit SPX4 is roughly the same as the photosensitive pixel circuit SPX3, and a difference therebetween lies in that the gate of the output transistor MOa receives the touch scan signal Sn, wherein the same or similar elements are denoted by the same or similar reference numerals. Moreover, the photosensitive pixel circuit SPX4 also performs roughly the same circuit operation as the photosensitive pixel circuit SPX3, and a description thereof is omitted herein.

Figure 5:
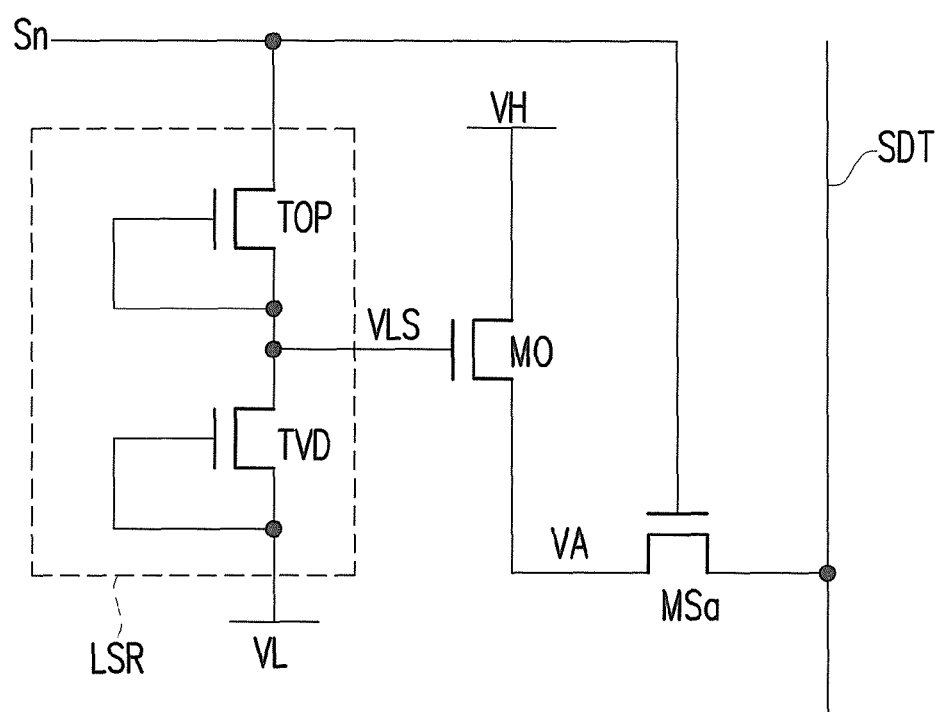
FIG. 5 is a schematic circuit diagram illustrating a photosensitive pixel circuit of a touch module according to the fifth embodiment of the invention.

FIG. 5 is a schematic circuit diagram illustrating a photosensitive pixel circuit of a touch module according to the fifth embodiment of the invention. Referring to FIG. 3A and FIG. 5, in the present embodiment, a photosensitive pixel circuit SPX5 is roughly the same as the photosensitive pixel circuit SPX3, and a difference therebetween lies in that a gate of a switch transistor MSa (corresponding to a second switch transistor) receives the touch scan signal Sn, wherein the same or similar elements are denoted by the same or similar reference numerals. Moreover, the photosensitive pixel circuit SPX5 also performs roughly the same circuit operation as the photosensitive pixel circuit SPX3, and a description thereof is omitted herein.

Figure 6:
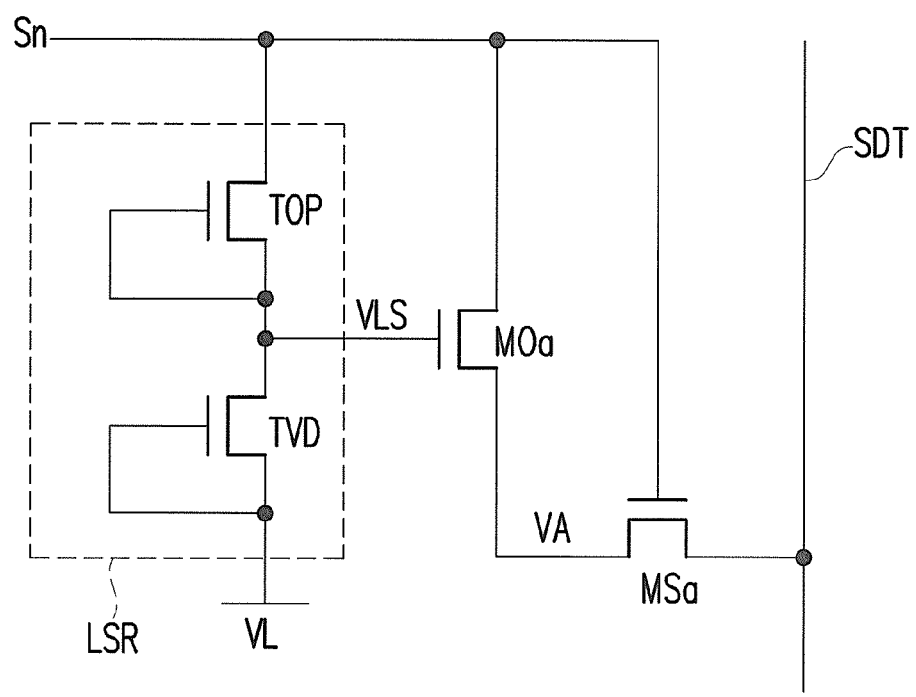
FIG. 6 is a schematic circuit diagram illustrating a photosensitive pixel circuit of a touch module according to the sixth embodiment of the invention.

FIG. 6 is a schematic circuit diagram illustrating a photosensitive pixel circuit of a touch module according to the sixth embodiment of the invention. Referring to FIG. 3A and FIG. 6, in the present embodiment, a photosensitive pixel circuit SPX6 is roughly the same as the photosensitive pixel circuit SPX3, and a difference therebetween lies in that the gate of the output transistor MOa receives the touch scan signal Sn, and the gate of the switch transistor MSa (corresponding to the second switch transistor) receives the touch scan signal Sn, wherein the same or similar elements are denoted by the same or similar reference numerals. Moreover, the photosensitive pixel circuit SPX6 also performs roughly the same circuit operation as the photosensitive pixel circuit SPX3, and a description thereof is omitted herein.

In summary, in the photosensitive pixel circuit of a touch module according to the embodiments of the invention, the light detection unit provides the light detection voltage according to the intensity of the light of a specific wavelength, so as to control a charging speed of the touch voltage provided by the output transistor. Accordingly, the sensing speed and sensing sensitivity of the touch module are increased. Moreover, the light detection unit detects the light of different wavelengths using two photosensitive transistors respectively, and generates the light detection voltage through voltage division by using these two photosensitive transistors, so as to compensate the ambient light part.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A photosensitive pixel circuit of a touch module, comprising:
    an output transistor comprising a first source/drain end, a second source/drain end and a first control end, the first source/drain end receiving a reference signal, the first control end receiving a light detection voltage, and the second source/drain end providing a touch voltage; and
    a light detection unit electrically connected to the first control end of the output transistor and receiving a touch scan signal, the light detection unit detecting an intensity of a first light according to the touch scan signal so as to correspondingly provide the light detection voltage.

2. The photosensitive pixel circuit of a touch module as claimed in claim 1, wherein the light detection unit comprises:

a first photosensitive transistor comprising a third source/drain end, a fourth source/drain end and a second control end, the first photosensitive transistor being configured to sense the first light, wherein the third source/drain end receives the touch scan signal, the second control end is electrically connected to the fourth source/drain end, and the fourth source/drain end provides the light detection voltage; and a voltage divider transistor comprising a fifth source/drain end, a sixth source/drain end and a third control end, wherein the fifth source/drain end is electrically connected to the fourth source/drain end, the third control end is electrically connected to the sixth source/drain end, and the sixth source/drain end receives a system low voltage.

3. The photosensitive pixel circuit of a touch module as claimed in claim 2, wherein the voltage divider transistor is a second photosensitive transistor configured to sense a second light, wherein the second light is different from the first light.

4. The photosensitive pixel circuit of a touch module as claimed in claim 3, wherein when the first light is one of an infrared light and an ultraviolet light, the second light is an ambient light.

5. The photosensitive pixel circuit of a touch module as claimed in claim 3, wherein when the first light is one of a green light, a red light and a blue light, the second light is another one of the green light, the red light and the blue light or other light.

6. The photosensitive pixel circuit of a touch module as claimed in claim 1, further comprising:

a first switch transistor comprising a seventh source/drain end, an eighth source/drain end and a fourth control end, wherein the seventh source/drain end is electrically connected to the second source/drain end to receive the touch voltage, the fourth control end receives a gate control signal, and the eighth source/drain end is electrically connected to a touch data line.

7. The photosensitive pixel circuit of a touch module as claimed in claim 1, further comprising:

a second switch transistor comprising a ninth source/drain end, a tenth source/drain end and a fifth control end, wherein the ninth source/drain end is electrically connected to the second source/drain end to receive the touch voltage, the fifth control end receives the touch scan signal, and the tenth source/drain end is electrically connected to a touch data line.

8. The photosensitive pixel circuit of a touch module as claimed in claim 1, wherein the reference signal has a fixed voltage.

9. The photosensitive pixel circuit of a touch module as claimed in claim 1, wherein the reference signal is the touch scan signal.

10. The photosensitive pixel circuit of a touch module as claimed in claim 1, wherein the touch scan signal is a pulse signal.

11. The photosensitive pixel circuit of a touch module as claimed in claim 1, wherein the first light is one of an infrared light, a green light, a red light, a blue light and an ultraviolet light.

* * * * *